United States Patent Office 2,858,202
Patented Oct. 28, 1958

2,858,202
ASPARTIC ACID DERIVATIVES

Louis O. Raether, Webster Groves, Mo., assignor to Monsanto Chemical Company, St. Louis, Mo., a corporation of Delaware No Drawing. Application December 29, 1955
Serial No. 556,041

15 Claims. (Cl. 71—2.7)

This invention relates to new and useful chemical compounds and to a process for preparing the same. More particularly, the invention relates to amides of aspartic acid.

Maleic acid is readily available in commercial quantities in the form of the anhydride and therefore is a useful raw material for chemical synthesis. Furthermore secondary alkyl amines are available as by-products of the petroleum industry.

Accordingly, an object of this invention is the provision of new and useful derivatives of maleic acid.

Another object is the provision of a process for making novel compounds having specific utility.

A further object is the provision of a new and useful class of general herbicides, and to provide a novel method of controlling undesired vegetation.

The compounds of the present invention may be represented by the following formula:

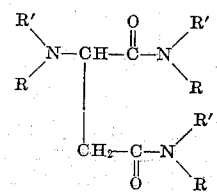

wherein R and R' represent like or unlike alkyl radicals containing from 4 to 18 carbon atoms. The aspartamides of preferred utility are those having from 6 to 14 carbon atoms.

The present N,N,N',N',N'',N'' hexa alkyl aspartamides are obtained by reacting maleic acid with secondary alkyl amines at moderately high temperatures and in the presence of solvents or suspension agents as for example, water, dioxane, mineral spirits, etc. Temperatures of from about 50° C. to the refluxing temperatures of the reaction mixtures are used. High temperatures may be attained by carrying out the reaction under pressure, however atmospheric pressure is normally sufficient.

The preferred conditions involve refluxing for a sufficient period of time to effect a condensation of the reagents. Since the reaction involves condensation of three mols of the secondary alkyl amine with one mol of the maleic acid, these reactants may be employed in stoichiometric proportions, however an excess of either reactant may be employed since any unreacted initial material may be recovered from the final product. The reaction may be conducted in the presence of alkali or an alkali metal hydroxide.

Specific examples of secondary alkyl amines which may be employed in this process include dibutylamine, dihexylamine, dioctylamine, diisobutylamine, butylhexylamine, amylhexadecylamine, ditetradecylamine and others of similar character.

As illustrative of the new compounds and their method of preparation, the following examples are given:

Example I

To a suitable reaction vessel containing 58 parts by weight (substantially 0.5 mol) of maleic acid in approximately 232 parts by weight of water is added with agitation 231 parts by weight (substantially 1 mol) of dioctylamine. The mixture is then heated and maintained at reflux temperatures overnight. An excess of aqueous sodium hydroxide (50% solution) is then added and the mixture is boiled overnight. The aqueous phase is then acidified and the acid extracted with ethyl alcohol. The alcoholic solution is evaporated to one-fourth volume and cooled overnight, and the cooled mixture so obtained is filtered. Approximately 96.8 parts by weight of a white crystalline solid identified as N,N,N',N',N'', N'' hexaoctyl aspartamide possessing a melting point of 31.6° C. is obtained.

Example II

Employing the procedure of Example I, but replacing dioctylamine with an equimolecular amount of diisobutylamine, a good yield of substantially pure N,N,N',N',N'',N'' hexaisobutyl aspartamide is obtained.

Example III

Employing the procedure of Example I, but replacing dioctylamine with an equimolecular amount of ditetradecylamine, a good yield of substantially pure

N,N,N',N',N'',N'' hexatetradecyl aspartamide is obtained.

Example IV

Employing the procedure of Example I, but replacing dioctylamine with an equimolecular amount of 2-ethylhexylhexylamine, a good yield of substantially pure N,N',N'' tri 2-ethylhexyl N,N',N'' trihexyl aspartamide is obtained.

Example V

Employing the procedure of Example I, but replacing dioctylamine with an equimolecular amount of didodecylamine, a good yield of substantially pure

N,N,N',N',N'',N'' hexadodecyl aspartamide is obtained.

The principal use of the new compounds is as contact herbicides. Accordingly it is recommended that a concentration of 0.005 to 1% of the active ingredient be employed, the concentration being adjusted so that at the drip point or run-off-point, sufficient active ingredient remains on the leaves to provide the desired herbicidal effect. By the proper selection and proportioning of the various conditioning agents, described below, either solid or liquid formulations can be prepared and so as to adapt the herbicide for achieving the desired result with any conventional device for treating the plant. The solid formulations or dusts may contain in addition to the active ingredient, diluents or extenders, preferably those which render the formulations permanently dry and free flowing. Effective solid diluents are clay, talc, pumice, diatomaceous earth, fuller's earth, etc. The liquid formulations, which are preferred, may be solutions or other liquid dispersions; the choice of the liquid medium will depend upon the physical properties of the active ingredient.

Usually the aspartamides of this invention are relatively water insoluble, so that the liquid formulations are compounded by dissolving the active ingredient in a small amount of a suitable organic solvent, such as water immiscible organic liquids, (for example isopropanol, benzene, acetone, kerosene etc.) and adding thereto a sufficient amount of a surface active dispersing agent to produce an emulsifiable liquid concentrate which is further diluted by the end user with water to prepare a spray mixture. Any surface active dispersing agent which is capable of acting at the interfacial surface between the liquid concentrate and water to facilitate the dispersion of the concentrate in the water may be employed, such as the water-soluble salts of the long chain carboxylic acids, quaternary salts of high molecular weight acids, alkylated phenols and other simple and polymeric compositions having both hydrophilic and hydrophobic functions which make possible the mixing of otherwise immiscible ingredients.

The conditioning agents above described facilitate the uniform distribution and aid in the destruction of undesirable vegetation by maintaining the active ingredient in a form which enables its prompt assimilation by the plant and the efficient utilization of its weed destroying properties. Thus, it enables an unskilled operator to achieve the desired herbicidal effects without the use of elaborate equipment.

Although the invention has been described with respect to certain specific embodiments it is not so limited and it is to be understood that variations and modifications thereof, which are obvious to those skilled in the art, may be made without departing from the spirit and scope of the invention.

What is claimed is:
1. A compound having the formula,

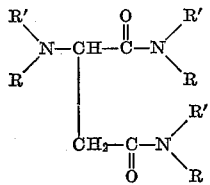

wherein R and R' represent alkyl radicals containing from 4 to 18 carbon atoms.

2. A compound having the formula,

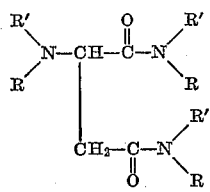

wherein R and R' represent alkyl radicals containing from 6 to 14 carbon atoms.

3. N,N,N',N',N'',N'' hexaisobutyl aspartamide.
4. N,N,N',N',N'',N'' hexaoctyl aspartamide.
5. N,N,N',N',N'',N'' hexatetradecyl aspartamide.
6. N,N',N'' tri 2-ethylhexyl-N,N',N'' trihexyl aspartamide.
7. N,N,N',N',N'',N'' hexadodecyl aspartamide.

8. A herbicidal composition of matter containing as its active ingredient from 0.005% to 1% by weight of a compound having the formula,

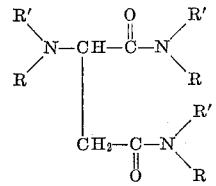

wherein R and R' represent akyl radicals containing from 4 to 18 carbon atoms, and a conditioning agent.

9. A method of destroying undesired plant growth by contacting said plants with a herbicidal composition containing as its essential active ingredient a compound having the formula,

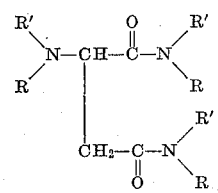

wherein R and R' represent alkyl radicals containing from 4 to 18 carbon atoms, said active ingredient being present in an amount which is injurious to said plants.

10. A method of destroying undesired plant growth by contacting the leaves with a herbicidal composition containing as an active ingredient a compound having the formula

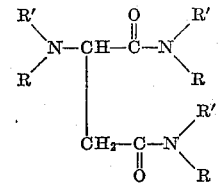

wherein R and R' represent alkyl radicals containing from 4 to 18 carbon atoms, said composition containing at least 0.005% by weight of said active ingredient.

11. The method of claim 10 wherein the active ingredient is hexaisobutylaspartamide.
12. The method of claim 10 wherein the active ingredient is N,N,N',N',N'',N''-hexaoctylaspartamide.
13. The method of claim 10 wherein the active ingredient is N,N,N',N',N'',N''-hexatetradecylaspartamide.
14. The method of claim 10 wherein the active ingredient is N,N',N''-tri-2-ethylhexyl-N,N',N''-trihexylaspartamide.
15. The method of claim 10 wherein the active ingredient is N,N,N',N',N'',N''-hexadodecylaspartamide.

References Cited in the file of this patent
UNITED STATES PATENTS
2,200,220    Reppe et al. _____ May 7, 1940
FOREIGN PATENTS
465,513    Great Britain _____ 1937
OTHER REFERENCES
McMillan et al.: "J. A. C. S.," 70:3778–3781 (1948).